United States Patent [19]

Rajala

[11] Patent Number: 5,602,747
[45] Date of Patent: Feb. 11, 1997

[54] CONTROLLING WEB TENSION BY ACTIVELY CONTROLLING VELOCITY OF DANCER ROLL

[75] Inventor: Gregory J. Rajala, Neenah, Wis.

[73] Assignee: Kimberly-Clark Corporation, Neenah, Wis.

[21] Appl. No.: 459,193

[22] Filed: Jun. 2, 1995

Related U.S. Application Data

[62] Division of Ser. No. 382,110, Jan. 31, 1995.

[51] Int. Cl.[6] .................... G06F 19/00; B65H 59/38
[52] U.S. Cl. ................... 364/469.01; 318/6; 226/44
[58] Field of Search .................... 364/469, 470, 364/471; 318/6, 7; 226/24, 27, 28, 44

[56] References Cited

U.S. PATENT DOCUMENTS

| | | | |
|---|---|---|---|
| 3,936,008 | 2/1976 | Crum | 242/75.44 |
| 4,000,865 | 1/1977 | Gaskins . | |
| 4,081,301 | 3/1978 | Buell | 156/164 |
| 4,151,594 | 4/1979 | Stern | 364/469 |
| 4,229,243 | 10/1980 | Ellinor | 156/269 |
| 4,239,578 | 12/1980 | Gore | 156/361 |
| 4,261,782 | 4/1981 | Teed | 156/361 |
| 4,293,367 | 10/1981 | Klasek et al. | 156/494 |
| 4,309,236 | 1/1982 | Teed | 156/164 |
| 4,405,397 | 9/1983 | Teed | 156/164 |
| 4,458,467 | 7/1984 | Shulman et al. | 53/399 |
| 4,464,217 | 8/1984 | Dickover et al. | 156/164 |
| 4,479,836 | 10/1984 | Dickover et al. | 156/164 |
| 4,572,098 | 2/1986 | Chiu | 118/33 |
| 4,786,346 | 11/1988 | Ales et al. | 156/160 |
| 4,801,345 | 1/1989 | Dussaud et al. | 156/164 |
| 4,838,969 | 6/1989 | Nomura et al. | 156/160 |
| 4,854,989 | 8/1989 | Singheimer | 156/161 |
| 4,889,293 | 12/1989 | Duke et al. | 242/75.51 |
| 4,915,767 | 4/1990 | Rajala et al. | 156/440 |
| 4,917,746 | 4/1990 | Kons et al. | 156/164 |
| 4,941,939 | 7/1990 | Nomura et al. | 156/495 |
| 4,946,539 | 8/1990 | Ales et al. | 156/495 |
| 5,080,741 | 1/1992 | Nomura et al. | 156/201 |
| 5,091,039 | 2/1992 | Ujimoto et al. | 156/519 |
| 5,147,487 | 9/1992 | Nomura et al. | 156/164 |
| 5,213,645 | 5/1993 | Nomura et al. | 156/164 |
| 5,221,390 | 6/1993 | Persson et al. | 156/164 |
| 5,236,539 | 8/1993 | Rogberg et al. | 156/495 |
| 5,275,676 | 1/1994 | Rooyakkers et al. | 156/164 |

FOREIGN PATENT DOCUMENTS

| | | |
|---|---|---|
| 0476818A1 | 3/1992 | European Pat. Off. . |
| 4-28363 | 1/1992 | Japan . |
| 4-28364 | 1/1992 | Japan . |
| 2241424 | 9/1991 | United Kingdom . |
| 2248380 | 4/1992 | United Kingdom . |

OTHER PUBLICATIONS

Kuribayashi, K. and Nakajima, K. "An Active Dancer Roller System For Tension Control of Wire and Sheet" Budapest, Hungry (no date).

*Primary Examiner*—Paul P. Gordon
*Attorney, Agent, or Firm*—Mark L. Davis

[57] ABSTRACT

This invention pertains to processing continuous webs such as paper, film, composites, and the like, in dynamic continuous processing operations. More particularly, it relates to controlling tension in such continuous webs during the processing operation. Tension is controlled in a dancer control system by connecting a corresponding dancer roll to a servo motor or the like, sensing position, tension, and velocity parameters related to the web and the dancer roll, and providing active gain force commands to cause translational movement in the dancer roll to control temporary, short-term tension disturbances in the web. In some applications of the invention, the dancer control system is used to attenuate short-term tension disturbances. In other applications of the invention, the dancer control system is used to create short-term tension disturbances.

25 Claims, 4 Drawing Sheets

CONTROLLING WEB TENSION BY ACTIVELY CONTROLLING VELOCITY OF DANCER ROLL

This is a divisional application of copending application Ser. No. 08/382,110, filed on Jan. 31, 1995 pending.

FIELD OF THE INVENTION

This invention relates to the processing of continuous webs such as paper, film, composites, or the like, in dynamic continuous processing operations. More particularly, it relates to controlling tension in such continuous webs during the processing operation.

BACKGROUND OF THE INVENTION

In the paper and plastic film industries, a dancer roll is widely used as a buffer between first and second sets of driving rolls, or first and second nips, which drive a continuous web. The dancer roll, which is positioned between the two sets of driving rolls, may also be used to detect the difference in speed between the first and second sets of driving rolls.

Typically, the basic purpose of a dancer roll is to maintain constant the tension on the continuous web which traverses the span between the first and second sets of driving rolls, including traversing the dancer roll.

As the web traverses the span, passing over the dancer roll, the dancer roll moves up and down in a track, serving two functions related to stabilizing the tension in the web. First, the dancer roll provides a damping effect on intermediate term disturbances in the tension in the web, e.g. disturbances that last more than 10 seconds. Second, the dancer roll temporarily absorbs the difference in drive speeds between the first and second sets of driving rolls, until such time as the drive speeds can be appropriately coordinated.

Typically, the dancer roll is suspended on a support system, wherein a generally static force supplied by the support system supports the dancer roll against an opposing force applied by the tension in the web and the weight of the dancer roll. So long as the tension in the web is constant, the dancer roll remains generally centered in its operating window on the track.

When the web encounters an intermediate or long term tension disturbance, temporarily increasing or decreasing the tension in the web, the imbalances of forces on the dancer roll cause translational movement in the dancer roll to temporarily restore the tension, and thereby the force balance. So when difference in the speeds of the first and second sets of drive rolls tend to accord a change in the web tension, the dancer roll temporarily maintains the tension.

Thus, the dancer roll generally stabilizes the tension in the web, by compensating for temporary changes in the operating tension. While the dancer roll, as conventionally used, provides valuable functions, it also has its limitations.

To the extent the tension disturbance is long term, such as a speed imbalance in the sets of driving rolls, the function of the dancer roll is only temporary, to accommodate the disturbance until resolution is addressed at the source by changing driving speeds. Such changing of the drive speeds is commonly known.

Conversely, to the extent the tension disturbance is short term, such as no more than 10 seconds, the mass and corresponding inertia of the dancer roll prevent the dancer from providing a meaningful response based on the static forces, during the period of existence of the disturbance. The response time based on the gravitational acceleration provided by the static forces is simply too slow to overcome the inertia of the dancer system in time to effectively counter such short-term tension disturbances.

It is known to provide an active drive to the dancer roll in order to reduce the response time in a static system, wherein the web is held under tension, but is not moving along the length of the web, whereby the dynamic disturbances, and the natural resonance frequencies of the dancer roll and the web are not accounted for, and whereby the resulting oscillations of the dancer roll can become unstable. Kuribayashi et al, "An Active Dancer Roller System for Tension Control of Wire and Sheet." University of Osaka Prefecture, Osaka, Japan, 1984.

However, it is not known to provide an active dancer roll in a dynamic system wherein dynamic variations in operating parameters are used to calculate variable active response force components for applying active and variable forces to the dancer roll, and wherein appropriate gain constants are used to compute effective response time without allowing the system to become unstable.

It is an object of the invention to provide methods and apparatus for controlling tension in a moving web, using a dancer roll, applying to the dancer roll a force having an active component, and adjusting the value of the active component at least one time per second.

It is another object to provide such methods and apparatus for controlling tension in a moving web, including sensing tension with sufficient frequency to identify a tension disturbance which exists for 10 seconds or less, and adjusting the active component of the force on the dancer roll at least five times during the existence of the tension disturbance.

Another object is to provide such methods and apparatus, including adjusting the value and direction of the active force component according to the equation $$T^*_{dancer} = r[F_{d\ static} + b_a(V^*_p - V_p) + k_a(F^*_c - F_c)].$$

A related object is to provide methods and apparatus for controlling the translational movement of the dancer roll such that the dancer roll, itself, creates controlled temporary and desirable tension disturbances.

Another objective is to provide methods and apparatus for providing such controlled tension disturbances repetitiously.

SUMMARY OF THE INVENTION

This invention describes apparatus and methods for controlling tension and tension disturbances in a continuous web during processing of the web. In a first aspect, the invention can be used to attenuate undesired tension disturbances in the web. In a second aspect, the invention can be used to create desired tension disturbances in the web.

In a typical converting process, a parent roll of paper, composite, or like web of raw material is unwound at one end of a processing line, and is processed through the processing line to thereby convert the raw material, such as to shorter or narrower rolls of product, or to shape products from the raw material, to separate products from the raw material, and/or to combine the raw material with other input elements to thereby create a product or product precursor. Such processing operations are generally considered "continuous" processes because the roll of raw material generally runs "continuously" for an extended period of time, feeding raw material to the processing system.

In such continuous processes, it is common to employ one or more dancer rolls to sense and control intermediate and longer term changes in the tension of the web. The focus of this invention is to sense and control short-lived disturbances in the tension of the web, and to sense the web tension with sufficient frequency that disturbances are detected early in their lives. Counteracting variable forces are applied to the dancer roll during the short lives of the disturbances, effecting active translational movement of the dancer roll that attenuates the effect of the short term tension disturbances.

A first family of embodiments of the invention is illustrated in a method of controlling web tension in a processing operation wherein a continuous web of material is advanced through a processing step and wherein the web experiences an average dynamic tension along a given section of the web. The method of controlling the tension in the respective section of web comprises the steps of providing a dancer roll operative on the respective section of web; applying a first generally static force component to the dancer roll, through the first generally static force component having a first value and direction, generally balancing the dancer roll against the average dynamic tension in the respective section of web, the dancer roll being passively responsive, through the first generally static force component, to thereby compensate for changes in web tension lasting longer than about 10 seconds; and applying a second active and variable force component to the dancer roll, the second variable force component having a second value and direction, modifying the first generally static force component, and thereby modifying (i) the effect of the first generally static force component on the dancer roll and (ii) the corresponding translational velocity of the dancer roll. The overall result is that the net translational velocity of the dancer roll is controlled by the additive result of the first generally static force component and the second active force component.

The method preferably includes adjusting the value and direction of the second variable force component, each such adjusted value and direction of the second variable force component (i) replacing the previous such value and direction of the second variable force component and (ii) acting in combination with the first static force component to provide a net translational velocity to the dancer roll. The preferred frequency of adjustment depends on the frequency of tension disturbances to be imposed or attenuated. Typical frequency is at least 1 time per second and, depending on the application, may be at least 500 times per second, or up to about 1000 times per second or more.

In preferred embodiments of the first family, the method includes sensing tension in the respective section of the web at least 1 time per second, preferably at least 500 times per second, more preferably up to about 1000 times per second, or more, recomputing the value and direction of the second variable force component using the sensed tension, and thereby adjusting the value and direction of the computed second variable force component at least 1 time per second, preferably at least 500 times per second, more preferably up to about 1000 times per second or more, and applying the recomputed value and direction to the dancer roll at a corresponding frequency.

Another way to approach the sensing step is sensing tension in the respective section of the web with sufficient frequency to identify a tension disturbance, in the web, which exists for a period of no more than about 10 seconds, preferably no more than about 0.67 second, more preferably no more than about 0.33 second, and most preferably no more than about 0.2 second, and using sensed tension to compute and thereby adjust the value and direction of the second variable force component at an adjustment frequency providing at least about five adjustments, preferably at least 100 adjustments, and more preferably at least 200 adjustments during the existence of each tension disturbance.

A second family of embodiments is illustrated in a method of controlling web tension in a similar processing operation wherein a continuous web of material is advanced through a processing step wherein the web experiences an average dynamic tension along a given section of the web. In this family of embodiments, the method of controlling the tension in the respective section of web comprises the steps of providing a dancer roll operative on the respective section of web; providing a servo motor connected to the dancer roll and thereby providing an actuating force to the dancer roll; measuring a first velocity of the web after the dancer roll; measuring a second velocity of the web at the dancer roll; measuring translational velocity of the dancer roll; sensing the position of the dancer roll; measuring web tension before and after the dancer roll; and controlling the servo motor with a computer controller which provides control commands to the servo motor based on the sensed position and the measured tensions and velocities, and thereby controlling the actuating force imparted to the dancer roll by the servo motor.

The method preferably includes computing a control force command with the computer controller and thereby computing the torque output command for the servo motor, using the equation:

$$T^*_{dancer} = r[F_{d\ static} + b_a(V^*_p - V_p) + k_a(F_c)]$$

wherein the dancer translational velocity set-point $V_p^*$ is calculated using the equation:

$$V^*_p = EA_o/(EA_o - F_o)[V_2(1 - F_b/EA_o) - V_3(1 - F_a/EA_o)]$$

and controlling the servo motor based on the torque output command so calculated.

As in the first family of embodiments, the computer controller typically provides control commands to the servo motor at a frequency of at least one time per second, preferably at least 500 times per second, most preferably up to at least about 1000 times per second, or more.

A third family of embodiments is also illustrated in a method of controlling web tension in a similar processing operation wherein a continuous web of material is advanced through a processing step wherein the web experiences an average dynamic tension along a given section of the web. In this third family of embodiments, the method of controlling the tension in the respective section of web comprises providing a dancer roll operative on the respective section of web; applying a first generally static force component, having a first value and direction, to the dancer roll, generally balancing the dancer roll against the average dynamic tension in the respective section of web, the dancer roll being passively responsive, through the first generally static force component, to thereby compensate for changes in web tension which last longer than about 10 seconds; sensing the position of the dancer roll within an operating window; controlling the position of the dancer roll by changing the relative speeds at which the web is (i) fed to the dancer roll and (ii) taken away from the dancer roll; and sensing a short duration tension disturbance in the web, existing for a period of no more than about 10 seconds, preferably no more than about 0.67 second, more preferably no more than about 0.33 second, most preferably no more than about 0.2 second, and imparting a corresponding counteracting translational force component to the dancer roll, and thereby attenuating the effect of the short duration tension disturbance.

While the instant above discussions relate to attenuating tension disturbances, the same general system (methods and apparatus) can be adapted to create a tension disturbance existing for generally no more than about 10 seconds in the web, preferably no more than about 0.67 second, more preferably no more than about 0.33 second, most preferably no more than about 0.2 second, by applying to the dancer roll a temporary and unbalancing force of corresponding short duration, thereby causing a temporary translational movement of the dancer roll and corresponding disturbance of the tension in the web.

A fourth family of embodiments of the invention comprehends processing apparatus for advancing a continuous web of material through a processing step wherein the web experiences an average dynamic tension along a given section of the web. The processing apparatus comprises a dancer roll operative for controlling tension on the respective section of web; actuating means for applying a first generally static force component to the dancer roll, through the first generally static force component having a first value and direction, and generally balancing the dancer roll against the average dynamic tension in the respective section of the web, the dancer roll being passively responsive, through the first generally static force component, to thereby compensate for changes in web tension which last longer than about 10 seconds, and for applying a second active and variable force component to the dancer roll, the second active and variable force component having a second value and direction, modifying the first generally static force component such that net translational velocity of the dancer roll is controlled by the net actuating force.

Preferably, the processing apparatus includes a computer controller, connected to the actuating means, for controlling the actuating force imparted to the dancer roll by the actuating means, and for recomputing and thereby adjusting the value and direction of the second variable force component at least 1 time per second, more preferably at least 500 times per second, still more preferably up to about 1000 times per second or more, each such value and direction of the second variable force component (i) replacing the previous such value and direction and (ii) acting in combination with the first static force component to provide a net translational velocity to the dancer roll.

The processing apparatus preferably includes sensing means for sensing tension in the respective section of the web, the sensing means being adapted for sensing tension in the respective section of the web at least 1 time per second, more preferably at least 500 times per second, still more preferably up to about 1000 times per second or more, the computer controller being connected to the actuating means, and being adapted for recomputing the value and direction of the second variable force component and thereby adjusting the value and direction of the computed second variable force component at least 1 time per second, preferably at least 500 times per second, more preferably up to about 1000 times per second or more, the actuating means being adapted to apply the recomputed second variable force component to the dancer roll, a corresponding number of times, according to the values and directions computed by the computer controller.

The sensing means preferably has frequency sensitivity sufficient to identify a tension disturbance in the web which exists for a period of no more than about 10 seconds, preferably no more than about 0.67 second, more preferably no more than about 0.33 second, most preferably no more than about 0.2 second, with the computer controller being adapted to recognize the period of existence of recurring such tension disturbances and to provide a response operative to adjust the value and direction of the second variable force component at an adjustment frequency providing an average of at least about five adjustments, preferably at least 100 adjustments, and more preferably at least 200 adjustments during the existence of each such tension disturbance.

A fifth family of embodiments of the invention comprehends processing apparatus for advancing a continuous web of material through a processing step wherein the web experiences an average dynamic tension along a given section of the web. The processing apparatus comprises a dancer roll operative for controlling tension on the respective section of web; a servo motor connected to the dancer roll and thereby providing an actuating force to the dancer roll; first means for measuring a first velocity of the web at the dancer roll; second means for measuring a second velocity of the web after the dancer roll; third means for measuring translational velocity of the dancer roll; fourth means for sensing the position of the dancer roll; fifth means for measuring web tension before the dancer roll; sixth means for measuring web tension after the dancer roll; and a computer controller for providing control commands to the servo motor based on the sensed position of the dancer roll, and the measured tensions and velocities, and thereby controlling the actuating force imparted to the dancer roll by the servo motor.

The computer controller is preferably adapted to compute a control gain force command, and thereby computing the torque output command for the servo motor, using the formula $$T^*_{dancer} = r[F_{d\ static} + b_a(V^*_p - V_p) + k_a(F^*_c - F_c)]$$

wherein the dancer translational velocity set-point $V^*_p$ is calculated using the formula $$V^*_p = \frac{EA_o}{EA_o - F_c}\left[V_2\frac{F_b}{(1-EA_o)} - V_3\frac{F_c}{(1-EA_o)}\right],$$

and to control the servo motor based on the torque output command so calculated, the computer controller typically being adapted to provide control commands to the servo motor at a frequency of at least 1 time per second, preferably at least 500 times per second, more preferably at least 1000 times per second.

In a sixth family of embodiments, the invention provides processing apparatus for advancing a continuous web of material through a processing step wherein the web experiences an average dynamic tension along a given section of the web. The processing apparatus comprises a dancer roll operative on the respective section of web; means for applying a first generally static force component, having a first value and direction, to the dancer roll, generally balancing the dancer roll against the average dynamic tension in the respective section of web, the dancer roll being passively responsive, through the first generally static force component, to thereby compensate for changes in web tension lasting longer than about 10 seconds; a first sensing and control system for sensing the position of the dancer roll within an operating window, and controlling the position of the dancer roll by changing the relative speeds at which the web is (i) fed to the dancer roll and (ii) taken away from the dancer roll; and a second sensing and control system for sensing, in the web, a short duration tension disturbance existing for a period of no more than about 10 seconds, and for imparting a corresponding counteracting force to the dancer roll, and thereby attenuating the effect of the tension disturbance.

While the instant above discussions relate to attenuating tension disturbances, generally, the same sensing and control equipment can be adapted to create a tension disturbance existing for generally no more than about 10 seconds in the web by applying, to the dancer roll, a temporary and unbalancing force of corresponding short duration, thereby causing a temporary translational movement of the dancer roll and corresponding temporary disturbance of the tension in the web. Preferably, the second sensing and control system can create a tension disturbance having even shorter duration, such as no more than about 0.67 second, preferably no more than about 0.33 second, most preferably no more than about 0.2 second.

BRIEF DESCRIPTION OF THE DRAWINGS

The present invention will be more fully understood and further advantages will become apparent when reference is made to the following detailed description of the invention and the drawings, in which.

DETAILED DESCRIPTION OF THE ILLUSTRATED EMBODIMENTS

The following detailed description is made in the context of a paper converting process. The invention can be appropriately applied to other flexible web processes.

Figure 1:
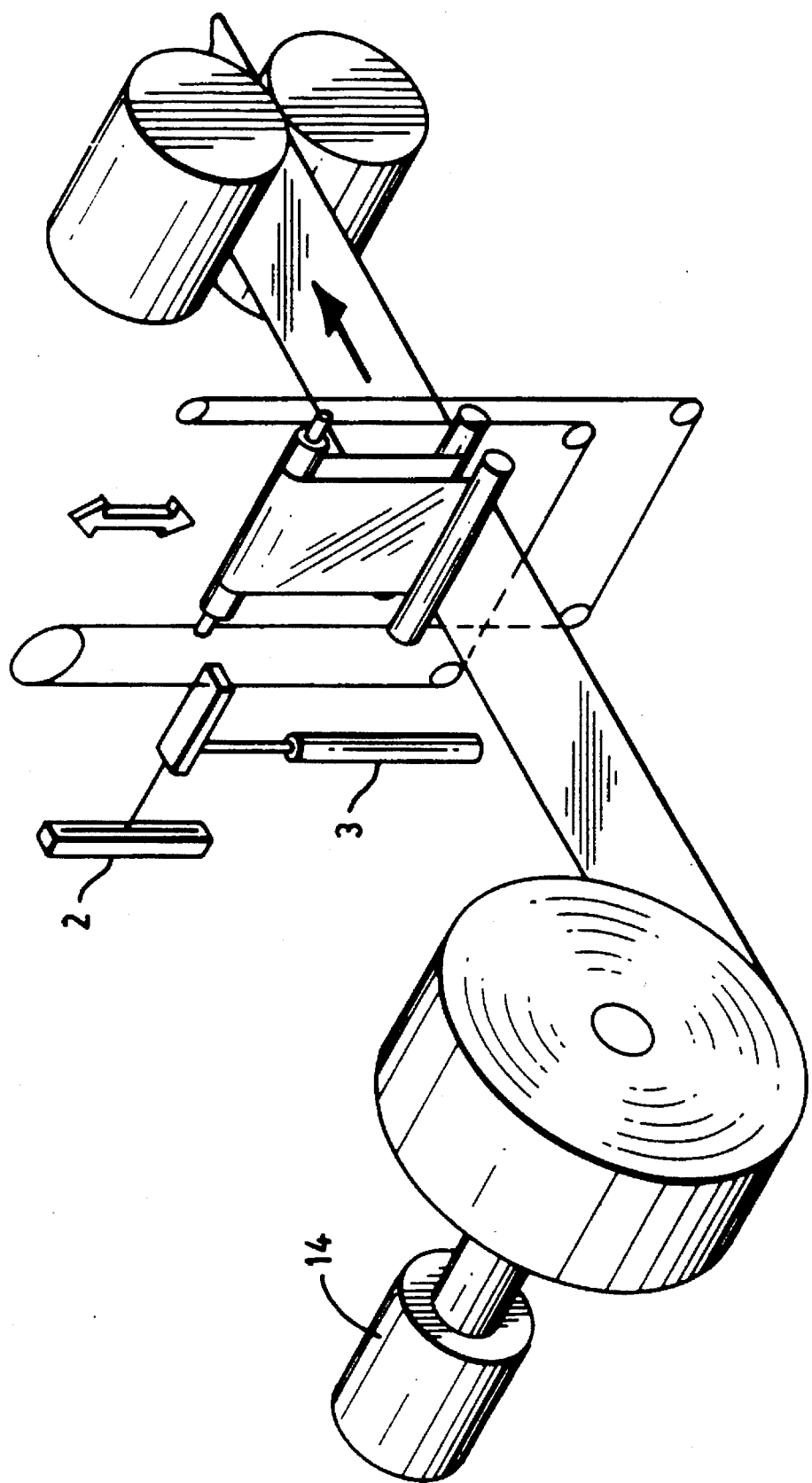
FIG. 1 is a pictorial view of part of a conventional processing operation, showing a dancer roll adjacent the unwind station.

FIG. 1 illustrates a typical conventional dancer roll control system. Speed of advance of web material is controlled by an unwind motor 14 in combination with the speed of the nip downstream of the dancer roll. The dancer system employs lower turning rolls before and after the dancer roll, itself. The dancer roll moves vertically up and down within the operating window defined between the lower turning rolls and the upper turning pulleys in the endless cable system. The position of the dancer roll in the operating window, relative to (i) the top of the window adjacent the upper turning pulleys and (ii) the bottom of the window adjacent the turning rolls is sensed by the position transducer 2. A generally static force having a vertical component is provided to the dancer roll support system by the air cylinder 3.

In general, to the extent the process take-away speed exceeds the speed at which web material is supplied to the dancer roll, the static forces on the dancer roll cause the dancer roll to move downwardly within its operating window. As the dancer roll moves downwardly, the change in position is sensed by the position transducer 2, which sends a corrective signal to the unwind motor 14 to increase the speed of the unwind. The speed of the unwind increases enough to return the dancer roll to the mid-point in its operating window.

By corollary, if the take-away speed lags the speed at which web material is supplied to the dancer roll, the static forces on the dancer roll cause the dancer roll to move upwardly within its operating window. As the dancer roll moves upwardly, the change in position is sensed by the position transducer 2. As the dancer rises above the mid-point in the operating window, the position transducer 2 sends a corresponding corrective signal to the unwind motor 14 to decrease the speed of the unwind, thereby returning the dancer roll to the mid-point in the operating window.

The above conventional dancer roll system is limited in that its response time is controlled by the gravitational contribution to vertical acceleration of the dancer roll, and by the mass of equipment in e.g. the unwind apparatus that must change speed in order to effect a change in the unwind speed.

Figure 2:
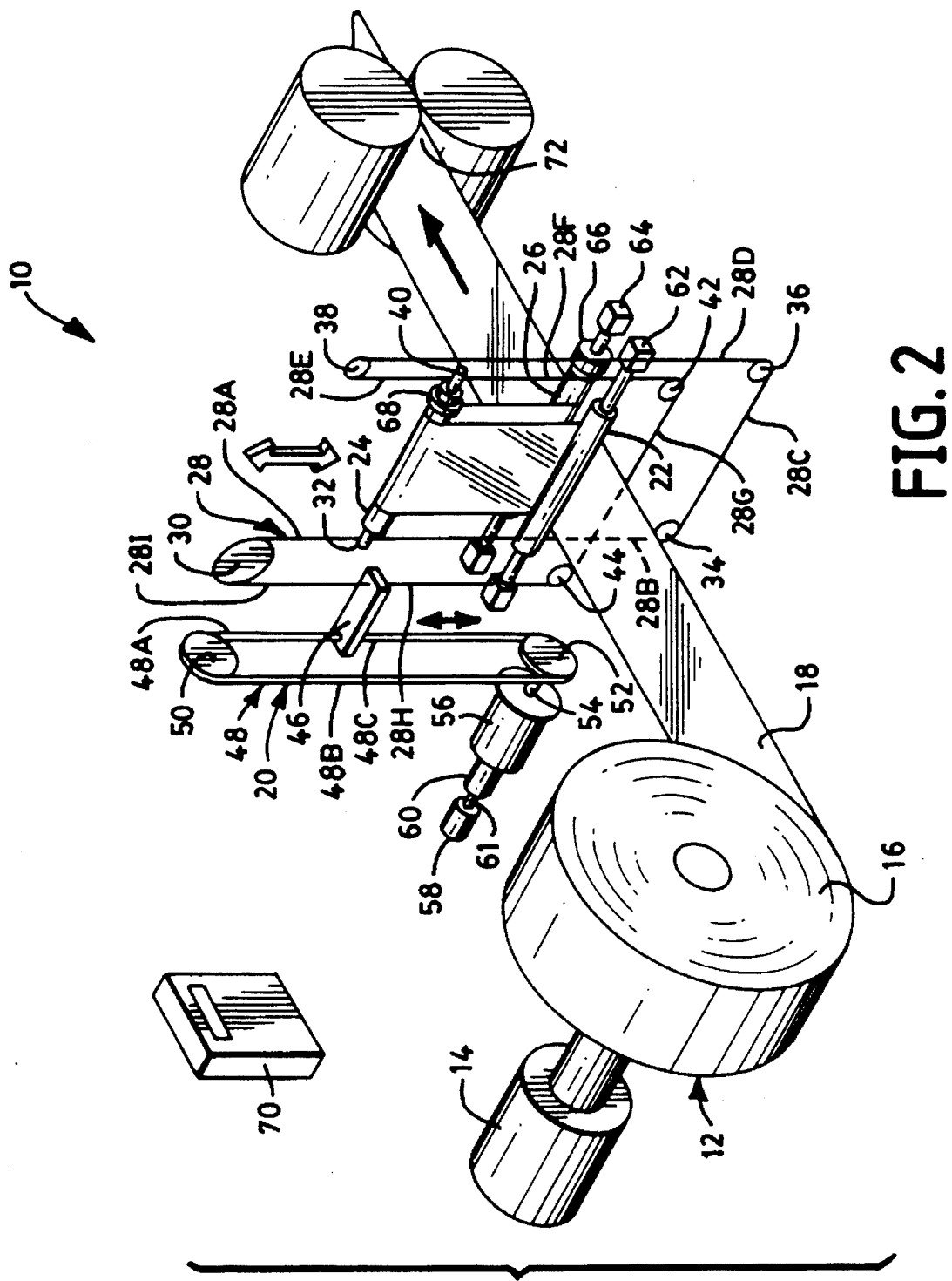
FIG. 2 is a pictorial view of one embodiment of the invention, again showing a dancer roll adjacent the unwind station.

Referring to FIG. 2, the process system 10 of the invention incorporates an unwind 12, including unwind motor 14 and roll 16 of raw material. A web 18 of the raw material is fed from the roll 16, through a dancer system 20, to the further processing elements of the converting process downstream of the dancer system 20.

In the dancer system 20, the web of material 18 passes under turning roll 22 before passing over the dancer roll 24, and passes under turning roll 26 after passing over the dancer roll 24. As shown, the dancer roll 24 is carried by a first endless drive cable 28.

Starting with a first upper turning pulley 30, the first endless drive cable 28 passes downwardly as segment 28A to a first end 32 of the dancer roll, and is fixedly secured to the dancer roll at the first end 32. From the first end 32 of the dancer roll, the drive cable continues downwardly as segment 28B to a first lower turning pulley 34, thence horizontally under the web 18 as segment 28C to a second lower turning pulley 36. From second lower turning pulley 36, the drive cable passes upwardly as segment 28D to a second upper turning pulley 38. From second upper turning pulley 38, the drive cable extends downwardly as segment 28E to the second end 40 of the dancer roll, and is fixedly secured to the dancer roll at the second end 40. From the second end 40 of the dancer roll, the drive cable continues downwardly as segment 28F to a third lower turning pulley 42, thence back under the web 18 as segment 28G to the fourth lower turning pulley 44. From fourth lower turning pulley 44, the drive cable extends upwardly as segment 28H to, and is fixedly secured to, connecting block 46. From connecting block 46, the drive cable continues upwardly as segment 28I to the first upper turning pulley 30, thus completing the endless loop of drive cable 28.

Connecting block 46 connects the endless drive cable 28 to an endless drive chain 48. From the connecting block 46, the endless drive chain 48 extends upwardly as segment 48A to a third upper turning pulley 50. From upper turning pulley 50, the endless drive chain extends downwardly as segment 48B to fifth lower turning pulley 52. From fifth lower turning pulley 52, the drive chain extends back upwardly as segment 48C to the connecting block 46, thus completing the endless loop of drive chain 48.

Shaft 54 connects the fifth lower turning pulley 52 to a first end of servo motor 56. Dancer roll position sensor 58 and dancer roll translational velocity sensor 60 extend from the second end of servo motor 56, on shaft 61.

Load sensors 62, 64 are disposed on the ends of turning rolls 22, 26 respectively for sensing stress loading on the turning rolls transverse to their axes, the stress loading on the respective turning rolls 22, 26 being interpreted as tension on the web.

Velocity sensor 66 is disposed adjacent the end of turning roll 26 to sense the turn speed of turning roll 26. Velocity sensor 68 is disposed adjacent the second end 40 of dancer roll 24 to sense the turn speed of the dancer roll, the turning speeds of the respective rolls being interpreted as corresponding to web velocities at the respective rolls.

The dancer system 20 is controlled by computer controller 70. Computer controller 70 is a conventional digital computer outfitted with conventional signal interface, which can be programmed in conventional languages such as "Basic," "Pascal," "C," or the like. Such computers are generically known as "personal computers," and are available from such manufacturers as Compaq® and IBM®. Suitable signal interface are available from such manufacturers as Keithley Metrabyte® and Computer Boards, Inc.®

Position sensor 58, velocity sensors 60, 66, 68, and load sensors 62, 64 all feed their inputs into the computer controller 70. Computer controller 70 processes the several inputs, computing a velocity set point $$V^*_p = EA_o/(EA_o - F_o)[V_2(1 - F_b/EA_o) - V_3(1 - F_c/EA_o)]$$

and a target servo motor torque command according to $$T^*_{dancer} = r[F_{d\ static} + b_a(V_p - V_p) + k_a(F^*_c - F_c)]$$

where $$F_{d\ static} = Mg + 2F^*_c$$

using the following variables:

$F_{d\ static}$=Static force component on the dancer roll $F_c$=Tension in the web after the dancer roll $F^*_c$=Tension in the web, target set point, per process design parameters $F_b$=Tension in the web ahead of the dancer roll $b_a$=Control gain constant re dancer translational velocity, in newton seconds/meter $k_a$=Control gain constant re web tension Mg=Mass of the dancer roll times gravity.

$V_p$=Instantaneous translational velocity of the dancer roll immediately prior to application of the second variable force component $V_2$=Velocity of the web at the dancer roll $V_3$=Velocity of the web after the dancer roll $V^*_p$=Translational velocity of dancer roll, set point r=Radius of pulley on the servo motor E=Modulus of elasticity of the web $A_o$=Cross-sectional area of the unstrained web $T^*_{dancer}$=Servo motor torque command $V^*_p$ represents the target translational velocity of the dancer roll 24, to be reached if the set point $V^*_p$ is not subsequently adjusted or otherwise changed.

The response time is affected by the value selected for the gain constant "$b_a$." The gain constant "$b_a$" is selected to impose a damping effect on especially the variable force component of the response, in order that the active variable component of the response not make the dancer roll so active as to become unstable, such as where the frequency of application of the responses approaches a natural resonant frequency of the dancer roll. Accordingly, the gain constant "$b_a$" acts somewhat like a viscous drag in the system. For example, in a system being sampled and controlled at 1000 times per second, and the mass of the dancer is 1 kg, a maximum control gain constant "$b_a$" is 2000.

Similarly, the gain constant "$k_a$" compensates generally for web tension errors in the system A typical gain constant "$k_a$" for the instantly above described processing system is 20,000.

It is contemplated that the operation and functions of the invention have become fully apparent from the foregoing description of elements and their relationships with each other, but for completeness of disclosure, the usage of the invention will be briefly described hereinafter.

In a first embodiment of the method of using the invention, a primary objective of the dancer system 20 is to attenuate short term tension disturbances in the web. Such short term tension disturbances might come, for example from unintended, but nonetheless normal, vibrations emanating from equipment downstream of the dancer roll 24, for example bearing vibration, motor vibration, and the like. In the alternative, such tension disturbances can also come from tension disturbances which are intentionally imposed on the web as the web is processed. An example of such intentional tension disturbances is shown in U.S. Pat. No. 4,227,952 Sabee herein incorporated by reference to show a tension disturbance being created with the formation of each tuck or pleat in the web of material being processed.

Whether the tension disturbances are imposed intentionally or unintentionally, the effect on the web is generally the same. As the web 18 traverses the processing system 10, the web is exposed to an average dynamic tension, representing a normal range of tensions as measured over a span of the web, for example between roll 16 of raw material and the next nip 72 downstream of the dancer roll 24, without considering short term tension disturbances that last for 10 seconds or less.

Figure 4:
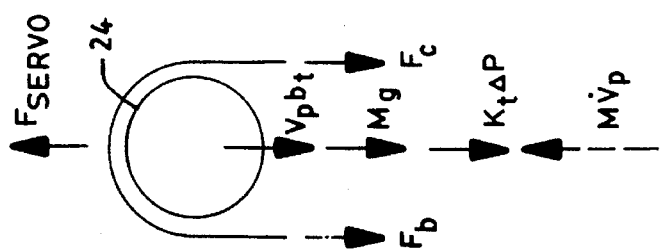
FIG. 4 is a free body force diagram showing the forces acting on the dancer roll.

In order for the dancer roll to operate as a "dancer" roll, the several forces acting on the dancer roll must still, in general, be balanced, as shown in FIG. 4. As shown in FIG. 4, the forces applied by the servo motor are balanced against the tension forces in the web, the weight of the dancer roll, any existing viscous drag effects times the existing translational velocity of the dancer roll, any existing spring effects times the change in positioning of the dancer roll, and the dancer mass time its vertical acceleration at any given time.

The servo motor force generally includes a first generally static force component $F_{d\ static}$, having a relatively fixed value, responsive to the relatively fixed static components of the loading on the dancer roll. The generally static force component $F_{d\ static}$ provides the general support that keeps the dancer roll more-or-less centered vertically in its operating window, between the turning rolls 22, 26 and the upper turning pulleys 30 and 38, responding based on the static force plus gravity. To the extent the dancer roll spends significant time outside a central area of the operating window, the computer 70 sends conventional commands to the line shaft drivers or the like to adjust the relative speeds between e.g. the unwind 12 and the nip 72 in the conventional way to thus bring the dancer roll generally back to the center of its operating window.

In addition to the static force component $F_{d\ static}$, the servo motor 56 exerts a dynamically active, variable force component, responsive to short-term tension disturbances in the web. The variable force component, when added to the static force component, comprehends the net vertical force command issued by the computer, to the servo motor. The servo motor 56 expresses the net vertical force command as torque $T^*_{dancer}$ delivered through the drive chain 48, drive cable 28, and connecting block 46, to the dancer roll. Accordingly, in addition to the normal passive response of the dancer roll, based on such static forces as mass, gravity, and web tension, the dancer control system of the invention adds a dynamic control component, outputted at the servo motor.

The result is a punctuation of the normal dancer system response characteristic with short-term vertical forces being applied to the dancer by the servo motor, with the result that the dancer roll is much more pro-active, making compensating changes in translational velocity much more frequently than a conventional dancer system that responds only passively. Of course, net translational velocity at any given point in time can be a positive upward movement, a negative downward movement, or no movement at all, corresponding in zero net translational velocity, all depending on the output command from the computer controller. The computer controller 70, of course, computes both the value and direction of the variable force, as well as the net force.

Figure 3:
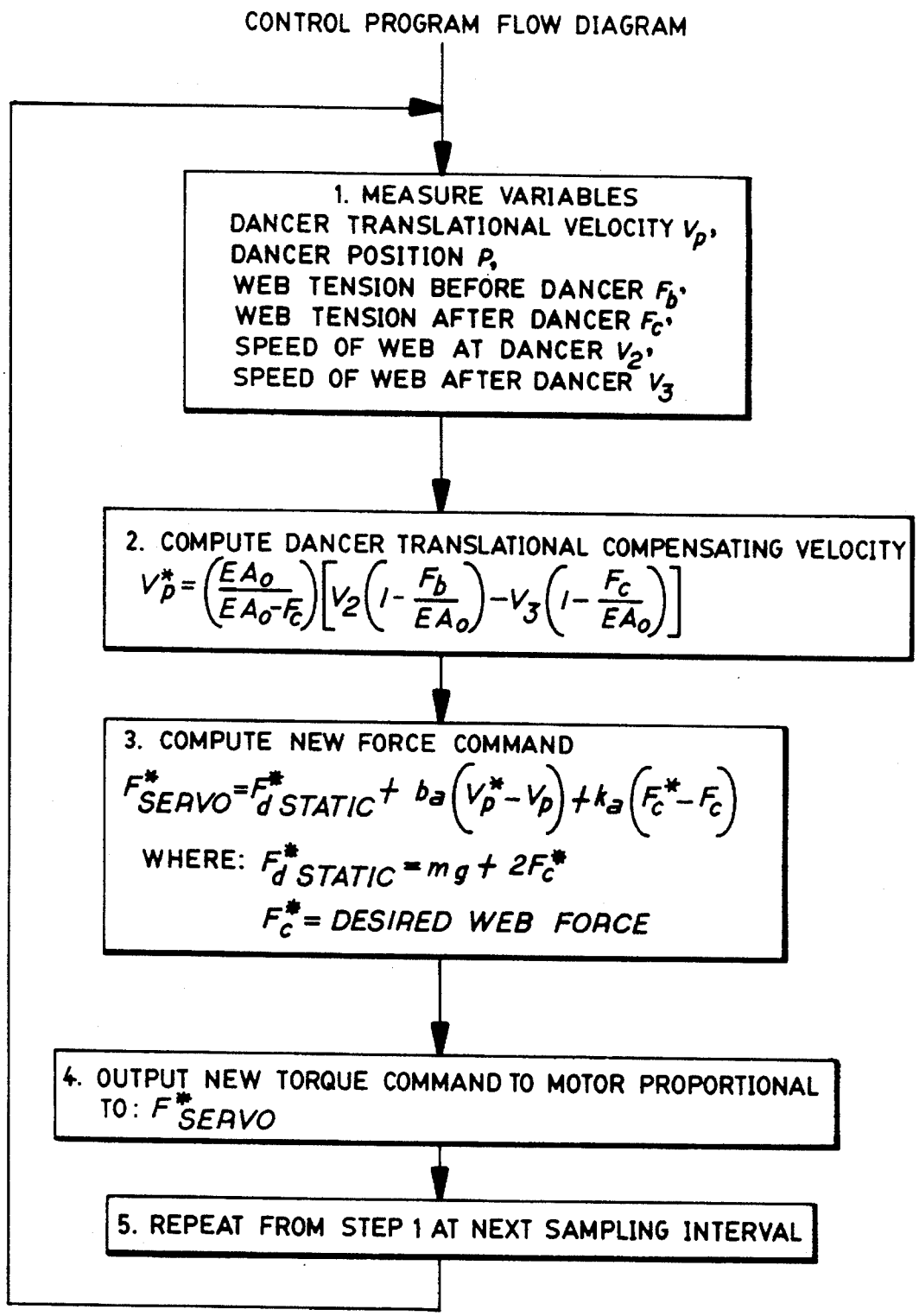
FIG. 3 is a flow diagram representing a control system of the invention.

The general flow of information and commands in a command sequence used in controlling the dancer system 20 is shown in block diagram format in FIG. 3. As seen therein, in step 1 in the command sequence, the variable parameters $V_p$, P, $F_b$, $F_c$, $V_2$, and $V_3$ are measured.

In step 2, the variables are combined with the known constants in the computer, and the computer computes $V^*_p$.

In step 3, $V^*_p$ is combined with additional static values to compute the new force command.

In step 4, the new force command is combined with a servo constant "r" to arrive at the proportional torque command $T^*_{dancer}$ outputted from the servo motor to the dancer roll through the drive chain 48 and drive cable 28.

In step 5, the sequence is repeated as often as necessary to obtain a response that controls the tension disturbances extant in the web under the dynamic conditions to which the web is exposed.

In general, the tension disturbances of interest in this invention are disturbances which can be attenuated within about 10 seconds, or less, by appropriate response through the novel combination of controls used in the dancer system. The inventor has found that the active variable force component should generally be computed, and applied to the dancer roll, at a frequency that applies at least 5, preferably at least about 100 control responses and more preferably at least about 200 control responses for each tension disturbance. Thus, if a given tension disturbance has a period of 10 seconds, then control responses $T^*_{dancer}$ should be applied at least every 0.05 seconds.

Since, as discussed above, the first step in the control cycle is sensing/measuring the several variables used in computing the variable force component of the response, it is critical that the sensors measure the variables frequently enough, to detect any tension disturbance that should be controlled early enough, to respond to and suppress the tension disturbance.

In order to have proper control of the dancer system 20, it is important that the computed responses be applied to the dancer roll frequently enough to control the dancer system. Again, at least 5 responses during the period of any tension disturbance is preferred. In order to provide sufficient frequency in the response application, especially where there is a variation in the frequency of occurrence of tension disturbances, it is preferred to measure the variables at a multiple of the anticipated desired frequency of applying a response.

Overall, the most critical frequency is the frequency of measuring the variables shown as step 1 in the Flow Diagram, FIG. 3. Similarly, each step in the process must be repeated with a frequency at least as great as the preferred frequency for applying the up-dated torque response commands.

The short-term tension disturbances addressed herein are typically less than 10 seconds in duration. Even shorter term tension disturbances, such as 0.67 second, 0.33 second, or even 0.2 second are readily controlled by the system disclosed herein. For example, a constantly repeated tension disturbance having a period of 10 seconds has a frequency of 6 cycles per minute. A period of duration of 0.67 second suggests a frequency of 100 cycles per minute. A period of duration of 0.33 second suggests a frequency of 200 cycles per minute. A period of duration of 0.2 second suggests 300 cycles per minute. Whatever the frequency of the relevant tension disturbances to be controlled, one need only multiply the frequency of occurrence of the tension disturbances by a factor of 200 to arrive at a first estimation of an acceptable frequency of the response. A few trials with the operating system, using modest variations of the frequency factor will reveal a desirable frequency for the particular processing system being controlled by the dancer roll 24.

Thus, tension disturbances occurring at a frequency of 100 disturbances per minute suggest a sensing frequency of at least 333 cycles per second. Correspondingly, tension disturbance frequency of 200 disturbances per minute suggest a sensing frequency, and corresponding response frequency of 667 cycles per second. Where a process is, for example, cutting 300 items from the web per minute, or otherwise imposing shocks on the web 300 times per minute, the sensors should be sensing the variables, and the servo motor 56 should be applying a recomputed variable response force component, at least 1000 times per second.

The dancer system 20 of this invention can advantageously be used with any dancer roll, at any location in the processing line. If there are no short term tension disturbances in the web, the dancer roll will operate like a conventional dancer roll. Then, when short term tension disturbances occur, the control system will automatically respond, to attenuate the short term tension disturbances.

Figure 5:
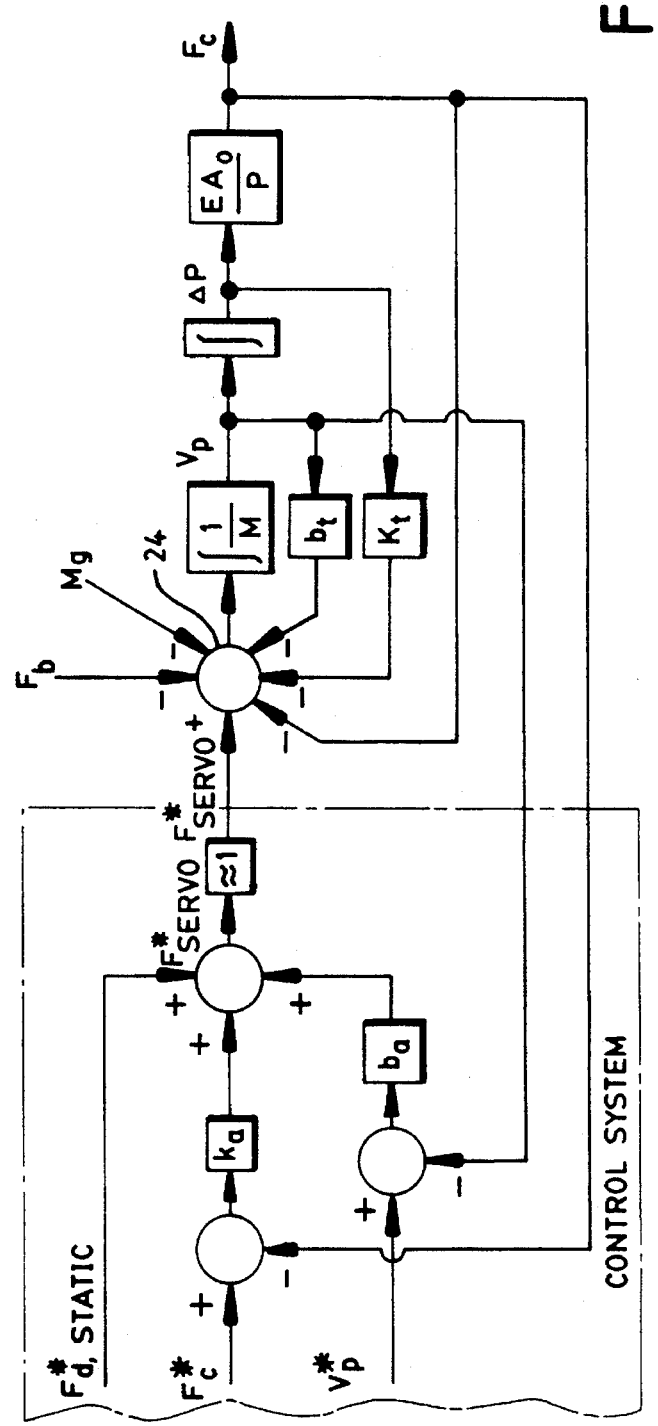
FIG. 5 is a control system block diagram.

Referring to FIG. 5, the dashed outline, represents calculations that occur inside the computer 70, with the resultant output of $F^*_{servo}$ being the output to the servo motor. The circle to the right of the computer controller represents the dancer roll 24, along with the several forces which act on the dancer roll. "M" represents the mass of the dancer roll 24; "g" represents gravity; and "P" represents the position of dancer roll 24.

As used herein, the term "tension disturbance" means a sudden pull such as to form a tuck, or a sudden relaxation as to temporarily eliminate all, or almost all, of the tension in the web. It includes all tension disturbances that can be significantly and finally attenuated by active response of the dancer control system. Correspondingly, it excludes normal increases and decreases in overall drive-line speed, which will overwhelm the dancer system if not corrected at, for example, the unwind station drive shaft. "Existence for no more than 10 seconds," referring to a tension disturbance includes disturbances that would last for more than 10 seconds if not treated with the active dancer system, but excludes disturbances where the active dancer treatment as disclosed herein cannot attenuate the entire disturbance within 10 seconds. Thus, the disturbances controlled by the control system of the invention can include single-step web take-ups such as disclosed in U.S. Pat. No. 4,227,952 Sabee, as well as two-step disturbances wherein the tension first is increased by a tension increase, and second is released over a similar period of time, such as when e.g. a turning roll rotates eccentrically.

"Sensed tension" can refer to more than one sensing cycle, and more than one location where the variable is sensed.

"Vertical velocity" means the translational velocity of the dancer roll 24 within its operating window.

In the claims that follow, reference is made to a "first sensing and control system" for sensing and controlling the static forces; and a "second sensing and control system" for sensing and controlling the dynamic forces. It should be understood that the first and second sensing and control systems are not mutually exclusive. Rather, they use common sensors, and common controllers, thereby generating a combined single output control force, based on the combination of force components attributable to the respective sensing and control systems.

The above described embodiments discuss the use of the dancer system 20 with respect to attenuating tension disturbances in the web. In corollary use, the dancer system 20 can also be used to create temporary tension disturbances. For example, in the process of incorporating lycra strands or threads into a garment, e.g. at a nip between an underlying web and an overlying web, it can be advantageous to increase, or decrease, the tension of the lycra at specific places as it is being incorporated into each garment. The dancer control system 20 of the invention can effect such short-term variations in the tension in the lycra.

Referring to FIG. 2, tension on the web is temporarily reduced or eliminated by inputting a force from servo motor 56 causing a sudden, temporary downward movement of the dancer roll, followed by a corresponding upward movement. Similarly, tension is temporarily increased by inputting a force from the servo motor 56 causing a sudden, temporary upward movement of the dancer roll, followed by a corresponding downward movement. Such a cycle of increasing and decreasing the tension can be repeated more than 200 times, e.g. up to 300 times per minute or more using the dancer system 20 of the invention.

For example, to reduce the tension quickly and temporarily to zero, the computer controller commands, and the servo acts, to impose a temporary translational motion to the dancer roll during the short period over which the tension is to be reduced or eliminated. The distance of the sudden translational movement corresponds with the amount of tension relaxation, and the duration of the relaxation. At the appropriate time, the dancer is again positively raised by the servo to correspondingly increase the web tension. By such cyclic activity, the dancer roll can routinely and intermittently impose alternating higher and lower (e.g. substantially zero). levels of tension on the web 18.

Having thus described the invention in full detail, it will be readily apparent that various changes and modifications may be made without departing from the spirit of the invention. All such changes and modifications are contemplated as being within the scope of the present invention, as defined by the following claims.

What is claimed is:

1. Processing apparatus for advancing a continuous web of material through a processing step wherein the web experiences an average dynamic tension along a given section of the web, the processing apparatus comprising:

(a) a dancer roll operative for controlling tension on the respective section of web;

(b) actuating means (i) for applying a first static force component to the dancer roll, through the first static force component having a first value and direction, and balancing the dancer roll against the average dynamic tension in the respective section of the web, the dancer roll being passively responsive, through the first static force component, to thereby compensate for changes in web tension lasting greater than about 10 seconds in duration, and (ii) for applying a second variable force component to the dancer roll, the combination of the first static force component and the second variable force component comprising a net actuating force; and (c) a computer controller, connected to the actuating means, the computer controller being adapted for controlling the net actuating force imparted to the dancer roll by the actuating means, and for adjusting the value and direction of the second variable force component at least 1 time per second, each such value and direction of the second variable force component replacing the previous such value and direction of the second variable force component, and acting in combination with the first static force component to impart a net translational velocity to the dancer roll, the second variable force component having a second value and direction, modifying the first static force component, such that net translational velocity of the dancer roll is controlled by the net actuating force.

2. Processing apparatus as in claim 1, said computer controller being effective for adjusting the value and direction of the second variable force component at least 500 times per second.

3. Processing apparatus as in claim 1, said computer controller being effective for adjusting the value and direction of the second variable force component at least 1000 times per second.

4. Processing apparatus as in claim 1, including sensing means for sensing tension in the web after said dancer roll, said computer controller being adapted to use the sensed tension in computing the value and direction of the second variable force component, and for imparting the computed value and direction to the actuating means.

5. Processing apparatus as in claim 4, said sensing means being adapted for sensing tension at least 1 time per second, said computer controller being connected to the actuating means, and being adapted for recomputing the value and direction of the second variable force component and thereby adjusting the value and direction of the computed second variable force component at least 1 time per second, the actuating means being adapted to apply the recomputed second variable force component to the dancer roll at least 1 time per second according to the values and directions computed by said computer controller.

6. Processing apparatus as in claim 4, said sensing means being adapted for sensing tension at least 500 times per second, said computer controller being connected to the actuating means, and being adapted for recomputing the value and direction of the second variable force component and thereby adjusting the value and direction of the computed second variable force component at least 500 times per second, the actuating means being adapted to apply the recomputed second variable force component to the dancer roll at least 500 times per second according to the values and directions computed by said computer controller.

7. Processing apparatus as in claim 4, said sensing means being adapted for sensing tension at least 1000 times per second, said computer controller being connected to the actuating means, and being adapted for recomputing the value and direction of the second variable force component and thereby adjusting the value and direction of the computed second variable force component at least 1000 times per second, the actuating means being adapted to apply the recomputed second variable force component to the dancer roll at least 1000 times per second according to the values and directions computed by said computer controller.

8. Processing apparatus as in claim 1, including sensing means for sensing tension in the respective section of the web with sufficient frequency to identify a tension disturbance in the web which exists for a period of no less than about 10 seconds in duration, said computer controller being adapted to recognize the period of existence of recurring such tension disturbances and operative to adjust the value and direction of the second variable force component at an adjustment frequency providing an average of at least about five adjustments during the existence of each such tension disturbance.

9. Processing apparatus as in claim 1, including sensing means for sensing tension in the respective section of the web with sufficient frequency to identify a tension disturbance in the web which exists for a period of less than about 0.67 second in duration, said computer controller being adapted to recognize the period of existence of recurring such tension disturbances and operative to adjust the value and direction of the second variable force component at an adjustment frequency providing an average of at least about five adjustments during the existence of each such tension disturbance.

10. Processing apparatus as in claim 1, including sensing means for sensing tension in the respective section of the web with sufficient frequency to identify a tension disturbance in the web which exists for a period of less than about 0.33 second in duration, said computer controller being adapted to recognize the period of existence of recurring such tension disturbances and operative to adjust the value and direction of the second variable force component at an adjustment frequency providing an average of at least about five adjustments during the existence of each such tension disturbance.

11. Processing apparatus as in claim 1, including sensing means for sensing tension in the respective section of the web with sufficient frequency to identify a tension disturbance in the web which exists for a period of less than about 0.2 second in duration, said computer controller being adapted to recognize the period of existence of recurring such tension disturbances and operative to adjust the value and direction of the second variable force component at an adjustment frequency providing an average of at least about five adjustments during the existence of each such tension disturbance.

12. Processing apparatus as in any one of claims 1–11 therefore, said computer controller being adapted to compute the second variable force component using the equation $$T^*_{dancer} = r[F_{d\ static} + b_a(V^*_p - V_p) + k_a(F^*_c - F_c)]$$

wherein r=radius of pulley on the servo motor, $F_{d\ static}$=static force component on the dancer roll and is equal to $M_g + 2F^*_c$, $M_g$=mass of the dancer roll times gravity, $F^*_c$=tension in the web, target set point, per process design parameters, $b_a$=control gain constant re dancer translational velocity, in Newton seconds/meter, $V^*_p$=translational velocity of dancer roll, set point, $V_p$=instantaneous translational velocity of the dancer roll immediately prior to application of the second variable force component, $k_a$=control gain constant re web tension, $F_b$=tension in the web ahead of the dancer roll, and $F_c$=tension in the web after the dancer roll.

13. Processing apparatus for advancing a continuous web of material through a processing step wherein the web experiences an average dynamic tension along a given section of the web, the processing apparatus comprising:

(a) a dancer roll operative for controlling tension on the respective section of web;

(b) a servo motor connected to said dancer roll and thereby providing an actuating force to said dancer roll;

(c) first means for measuring a first velocity of the web after said dancer roll;

(d) second means for measuring a second velocity of the web at said dancer roll;

(e) third means for measuring translational velocity of said dancer roll;

(f) fourth means for sensing the position of said dancer roll;

(g) fifth means for measuring web tension before said dancer roll;

(h) sixth means for measuring web tension after said dancer roll; and (i) a computer controller for providing control commands to said servo motor based on the sensed position of the dancer roll, and the measured tensions and velocities, and thereby controlling the actuating force imparted to said dancer roll by said servo motor.

14. Processing apparatus as in claim 13, said computer controller being adapted to provide control commands to said servo motor at a frequency of at least 1000 times per second.

15. Processing apparatus as in claim 13, said computer controller being adapted to provide control commands to said servo motor at a frequency of at least 1 time-per second.

16. Processing apparatus as in claim 13, said computer controller being adapted to provide control commands to said servo motor at a frequency of at least 500 times per second.

17. Processing apparatus as in claim 13, said computer controller being adapted to compute a control gain force command using the equation $$T^*_{dancer} = r[F_{d\ static} + b_a(V^*_p - V_p) + k_a(F^*_c - F_c)]$$ wherein the dancer translational velocity set-point $V^*_p$ is calculated using the equation $$V^*_p = EA_o/(EA_o - F_c)[V_2(1 - F_b/EA_o) - V_3(1 - F_c/EA_o)],$$

and to control said servo motor based on the gain force so calculated wherein $F_{d\ static}$=static force component on the dancer roll and is equal to $M_g + 2F^*_c$, $F_c$=tension in the web after the dancer roll $F^*_c$=tension in the web, target set point, per process design parameters, $F_b$=tension in the web ahead of the dancer roll, $b_a$=control gain constant re dancer translational velocity, in Newton seconds/meter, $k_a$=control gain constant re web tension, $M_g$=mass of the dancer roll times gravity, $V_p$=instantaneous translational velocity of the dancer roll immediately prior to application of the second variable force component, $V_2$=velocity of the web at the dancer roll, $V_3$=velocity of the web at the dancer roll, $V^*_p$=translational velocity of dancer roll, set point, r=radius of pulley on the servo motor, E=Modulus of elasticity of the web, and $A_o$=cross-sectional area of the unstrained web.

18. Processing apparatus as in claim 17, said computer controller being adapted to provide control commands to said servo motor at a frequency of at least 1 time per second.

19. Processing apparatus as in claim 17, said computer controller being adapted to provide control commands to said servo motor at a frequency of at least 500 times per second.

20. Processing apparatus as in claim 17, said computer controller being adapted to provide control commands to said servo motor at a frequency of at least 1000 times per second.

21. Processing apparatus for advancing a continuous web of material through a processing step wherein the web experiences an average dynamic tension along a given section of the web, the processing apparatus comprising:

(a) a dancer roll operative on the respective section of web;

(b) means for applying a first static force component, having a first value and direction, to the dancer roll, balancing the dancer roll against the average dynamic tension in the respective section of web, the dancer roll being passively responsive, through the first static force component, to thereby compensate for changes in web tension lasting greater than about 10 seconds in duration;

(c) a first sensing and control system for sensing the position of the dancer roll, and controlling the vertical position of the dancer roll by making operating condition adjustments over a period of time greater than 10 seconds, and thereby confining the dancer roll to an operating window; and (d) a second sensing and control system for sensing, in the web, a short duration tension disturbance existing for a period of less than about 10 seconds in duration, and for imparting a corresponding counteracting force component to the dancer roll, and thereby attenuating the effect of the short duration tension disturbance on the processing of the web.

22. Processing apparatus for advancing a continuous web of material serially through a processing step wherein the web experiences an average dynamic tension along a given section of the web, the processing apparatus comprising:

(a) a dancer roll operative on the respective section of web;

(b) means for applying a first static force component, having a first value and direction, to the dancer roll, balancing the dancer roll against the average dynamic tension in the respective section of web, the dancer roll being passively responsive, through the first static force component, to thereby compensate for changes in web tension lasting greater than about 10 seconds in duration;

(c) a first sensing and control system for sensing the position of the dancer roll, and controlling the vertical position of the dancer roll by making operating condition adjustments over a period of time greater than 10 seconds, and thereby confining the dancer roll to an operating window; and (d) a second sensing and control system for creating a tension disturbance existing for less than about 10 seconds in duration in the web by applying, to the dancer roll, a temporary and unbalancing force of corresponding duration, thereby causing a temporary translational movement of the dancer roll and corresponding disturbance of the tension in the web.

23. Processing apparatus as in claim 22, said second sensing and control system being adapted for sensing a short duration tension disturbance in the web, existing for a period of less than about 0.67 second in duration.

24. Processing apparatus as in claim 22, said second sensing and control system being adapted for sensing a short duration tension disturbance in the web, existing for a period of less than about 0.33 second in duration.

25. Processing apparatus as in claim 22, said second sensing and control system being adapted for sensing a short duration tension disturbance in the web, existing for a period of less than about 0.2 second in duration.

* * * * *